Patented June 2, 1936

2,042,458

UNITED STATES PATENT OFFICE 2,042,458

PRODUCTION OF ESTERS OF METHACRYLIC ACID

John William Croom Crawford, Ardrossan, Scotland, assignor to Imperial Chemical Industries Limited, a corporation of Great Britain No Drawing. Application September 14, 1934, Serial No. 744,091. In Great Britain October 31, 1933

10 Claims. (Cl. 260—106)

This invention relates to improvements or modifications in the production of esters of methacrylic acid by the interaction of acetone cyanhydrin, a mineral acid, and an alcohol.

According to this invention esters of methacrylic acid are produced by treating acetone cyanhydrin with concentrated or fuming sulphuric acid at raised temperature and subsequently heating the reaction mixture with a monohydric alcohol. In a preferred form of this process the reaction mixture of acetone cyanhydrin and sulphuric acid is maintained at a temperature of about 140° C. for at least 1 hour before adding the alcohol.

According to the present invention an improved or modified process comprises heating the reaction mixture, after the treatment of the acetone cyanhydrin and sulphuric acid at a raised temperature has been substantially complete, with a quantity of water preferably amounting to not more than four molecular proportions for every molecular proportion of acetone cyanhydrin. My best results have been obtained when about two molecular weights of water are added for each molecular weight of acetone cyanhydrin. The water may be added together with the appropriate alcohol for the ester desired, and the mixture heated. I find, however, that it is advantageous to add the water and to heat to refluxing temperature for some time before adding the alcohol. The alcohol is then added and the heating continued for a further period to affect the esterification. By this means the total time required for the process is appreciably less, particularly with the lower alcohols, than if the water and alcohol were added together and the mixture simply heated to refluxing temperature.

In the preferred form of the invention the reaction between the acetone cyanhydrin and sulphuric acid or oleum is carried out in the presence of an antipolymerization catalyst at temperatures of about 80° to 90° C. The maintenance of a suitable temperature range may be controlled by the rate of mixing of the reactants and, if required, suitable cooling. After mixing the reactants, the temperature of the mass is maintained between 100° and 140° C. preferably approaching the latter temperature, for a period of time; e. g. about one hour. The water is then added and the heating of the mixture continued under refluxing conditions for a further period, e. g. about three hours; after which the alcohol is added and the refluxing continued for another 2 to 3 hours. If a lower boiling alcohol is used I find that it is preferable to cool the reaction mixture before adding the alcohol thereby avoiding excessive refluxing immediately on its addition.

Alternatively, the water and the alcohol may be added simultaneously to the mixture; in this case also heating follows under refluxing conditions, for example for a period of 15 hours in the case of methyl alcohol.

In both forms of the process the amount of alcohol is suitably about two molecular proportions for each molecular proportion of acetone cyanhydrin.

After heating with the alcohol, the reaction product may be isolated by known methods; for example, by direct separation after pouring the reaction mixture into water or brine or distilling either directly or in a current of steam.

The invention is illustrated by the following examples, in which all parts are parts by weight.

*Example 1*—The crude acetone cyanhydrin is prepared by allowing one molecular proportion of acetone to react with 1.03 proportion of hydrogen cyanide, in the presence of caustic potash as catalyst, and stabilized after completion of the reaction by addition of a slight excess of sulphuric acid over that necessary to neutralize the potash catalyst. Estimation shows the product to contain 85% acetone cyanhydrin. This is distilled in vacuo, the distillate collected being practically 100% acetone cyanhydrin.

850 parts of the so prepared pure acetone cyanhydrin are run with good mechanical agitation into 1500 gms. of 98% sulphuric acid containing 15 parts of sulphur flowers. The temperature of the reaction mixture is maintained by cooling at 70°–80° until all the cyanhydrin has been added, when the temperature of the reaction mixture is raised to 140° for 1 hour. Whilst heating through the temperature region of about 100°, foaming is inclined to start, and agitation is, therefore, stopped at this stage until gas evolution has subsided, when stirring is recommended. After heating at 140°, the temperature of the reaction mixture is lowered at 65°, and 10 parts of tannic acid and a mixture of 360 parts of water and 640 gms. of methyl alcohol are added. The reaction mixture is refluxed for 18 hours, and poured with stirring into 3000 parts of strong brine. The whole is filtered to remove sulphur which hinders separation, and the ester layer removed. It is given a further wash with brine (1000 parts) to remove methyl alcohol and at this stage weighs 732 parts. Drying over calcium chloride, 20 parts, and distillation gives 602 parts of pure ester, plus 118 parts of a mixture of ester and methacrylic acid which may be converted into pure ester by further treatment with methyl alcohol in the known manner of preparing esters.

Example 2.—850 parts of crude 87% acetone cyanhydrin are mixed with stirring into a suspension of 4 parts of flowers of sulphur in 1500 parts of oleum of 5% free sulphuric anhydride content. The temperature is kept low, 100°, by cooling during the addition, and thereafter raised to 130–135° for a period of 1 hour, with continued stirring. At the end of this period, the temperature of the mixture is lowered to about 70°, and 10 parts of tannic acid, followed by a mixture of 360 parts of water and 640 parts of methyl alcohol, are added. This mixture is refluxed for 13 hours and poured into twice its volume of concentrated brine, with good stirring. The separated layer of ester is removed and washed again with an equal volume of brine to remove unchanged methyl alcohol. The ester, separated from this wash, weighs 792 parts. It is dried over 20 parts of calcium chloride. After drying, the ester weighs 775 parts equivalent to 77.7% yield on the acetone used to produce the cyanhydrin. It may further be purified, for instance by fractional distillation under a slight vacuum, when 683 parts of pure ester are obtained, with 80 parts of residue, consisting of a mixture of ester and methacrylic acid which may be converted into ester by known methods.

Example 3.—850 parts of crude 95% acetone cyanhydrin were added to 1500 parts of 100% sulphuric acid containing in suspension, as an antipolymerization catalyst, 4 parts of copper bronze powder (90% Cu, 10% Zn). The reactants were mixed in an enamelled jacketed vessel with good agitation and maintenance of the temperature at 80–85° C. To maintain this temperature during the addition of the acetone cyanhydrin it was necessary to flow cooling water through the jacket. On completion of the addition of the cyanhydrin the temperature was raised to 130° C. and maintained about this figure for one hour. 360 parts of water were then added gradually and the mixture heated under refluxing conditions for 3 hours during which period the temperature of the reaction mixture was about 125° C. The temperature was lowered somewhat and 640 parts of methyl alcohol gradually added, avoiding excessive refluxing. This mixture was then boiled under reflux for 2 hours measured from the commencement of the alcohol addition, the temperature of the reaction mixture being about 80° C.

After this heating the reaction mixture was agitated with 3000 parts of strong brine, the ester layer then separated and again washed with brine to yield a crude product containing 696 parts methyl methacrylate and 47 parts methacrylic acid. A purified methyl methacrylate boiling at 61.5° C., under 200 mm. mercury pressure, was obtained by fractional distillation through a column under 200 mm. pressure. The methacrylic acid was returned to the process for esterification in a later batch.

Example 4.—850 parts by weight of crude 95% cyanhydrin were added to 1500 parts of 100% sulphuric acid containing 4 parts of copper bronze, heated 1 hour at 130° C. and boiled with 360 parts of water as described in Example 3.

The reaction product was cooled to 80° C. 1200 parts of isopropyl alcohol were added with stirring, and the stirred mixture heated to refluxing temperature (around 88°) for 2 hours. It was then run into 3000 parts of agitated water and the ester layer removed and washed with 1000 parts of water. The partially purified ester separated from this washing treatment weighed 1020 parts and analyzed 66.1% of isopropyl methacrylate and 11.6% of free methacrylic acid.

In order to further purify the ester, it was agitated with 65 parts of 5% solution of caustic soda, separated and washed twice with water, then dried over 30 parts of calcium chloride, 1–2 parts of tannic acid being added to prevent polymerization and finally distilled under reduced pressure, using a fractionating column. The ester was collected at 77.5–82.5° C. at a pressure of 184 mm.

Example 5.—850 parts of crude acetone cyanhydrin of 88.5% purity were mixed into a stirred suspension of 4 parts of sulphur in 1500 parts of sulphuric acid containing 5.9% of free sulphuric anhydride, at a temperature of between 70° and 80° C. and thereafter the mixture heated for 4 hours to a temperature of 110–115°, cooled to 60°, and a mixture of 360 parts of water, 640 parts of methyl alcohol and 10 parts of tannic acid added. After boiling under reflux for 15 hours, the mixture was run into 3000 parts of brine and agitated. The ester layer was then removed and washed with a further 1000 parts of brine. After drying with 20 parts of calcium chloride it weighed 410 parts and on distillation there were obtained 358 parts of methyl methacrylate and a residue of crude methacrylic acid weighing 48 parts.

Example 6.—850 parts of crude 95% acetone cyanhydrin were added with stirring to a mixture of 4 parts of copper bronze (90% copper, 10% zinc) and 1500 parts of 100% sulphuric acid, at a temperature of 80° C. The product was heated to a temperature of 130° C. for 1 hour and then treated with 360 parts of water and boiled for 3 hours under a reflux condenser (the temperature of the boiling liquid being around 128°), with agitation. 640 parts of methyl alcohol were added and the mixture boiled under reflux for 2 hours, run into brine and worked up as in Example 2. The washed ester weighed 773 parts and contained 90.0% methyl methacrylate and 5.18 parts of methacrylic acid.

Example 7.—255 parts of rectified acetone cyanhydrin were added with agitation to a suspension of 3 parts of sulphur in 450 parts of 98% sulphuric acid, at a temperature of 70–80° C. The mixture was heated, still with stirring, to a temperature of 140° C. for 1 hour cooled to 100° C. and a mixture of 108 parts of water and 444 parts of butyl alcohol added. This mixture was refluxed for 3 hours, the temperature of the boiling liquid reaching 120° C. and then after cooling, poured into 1000 parts of water. The ester layer, weighing 622 parts, was separated, washed with dilute alkali, dried over calcium chloride, and fractionally distilled to separate butyl alcohol and butyl methacrylate. The latter was collected between 81° and 86° C. at a pressure of 50 mm. of mercury, the bulk of the fraction passing over at 85–86° C. It weighed 248 parts.

Example 8.—450 parts of sulphuric acid containing 3 parts of sulphur flowers in suspension were well agitated and 255 parts of crude 88% acetone cyanhydrin run in, the temperature of the mixture being kept at 80° C. by cooling and by regulation of the rate of addition of the cyanhydrin. The mixture was heated, still with stirring, for 1 hour to 140° C., cooled off to about 100° C. and treated with 3 parts of tannic acid, 108 parts of water, and 444 parts of normal butyl alcohol. Heat was then applied until the mixture boiled and boiling continued under a reflux condenser for 3 hours, the temperature of the liquid being about 120° C. The product was allowed to cool off and run into 1000 parts of water. An upper layer of crude ester weighing 622 parts was removed, washed with dilute alkali and dried over calcium chloride. The dried crude ester was separated from accompanying normal butyl alcohol by fractional distillation under reduced pressure, 248 parts of normal butyl methacrylate, boiling point 81–86° C./50 mm. being obtained.

Example 9.—340 parts by weight of crude 95% acetone cyanhydrin were mixed with agitation into a suspension of 2 parts of copper bronze (90:10: copper:zinc) in 450 parts of 100% sulphuric acid at a temperature of 80° C. The product was heated to 130° C. for 1 hour with agitation, and cooled to 110° C. 108 parts of water were then added and the mixture boiled under reflux for 2 hours, the temperature of the mixture being about 130°. It was cooled to 80°, 444 parts of isobutyl alcohol added and again boiled under reflux for 2½ hours, the final temperature of the liquid being 107°. The cooled product was run into 1000 parts of water, agitated and the ester layer removed. It weighed 686 parts and contained 60.8% of isobutyl methacrylate and 3.9% of methacrylic acid and was purified, after washing with alkali, by fractional distillation.

Example 10.—850 parts of crude 95% acetone cyanhydrin were mixed at a temperature of 80° into 1500 parts of sulphuric acid containing 0.4% of sulphuric anhydride, in which were suspended 4 parts of copper bronze powder. The mixture was heated for 1 hour to a temperature of 130°, 360 parts of water were added, and the mixture was then boiled under a reflux condenser for 2 hours. At the conclusion of this period the reaction mixture was cooled to 116°, and 1800 parts of glycol monoethyl ether containing 10 parts of tannic acid were added slowly. When the addition was complete, the mixture was warmed to 100–110° for 4¼ hours, with agitation. The reaction mass was then cooled and treated with 1500 parts of water, and the ester was separated. After two further washings with 1000 parts of water, the crude ester weighed 828 parts and contained 82.3% of beta-ethoxy ethyl methacrylate and 7.9% of free methacrylic acid. For further purification the ester was distilled under reduced pressure.

I claim:

1. In a process for the preparation of esters of methacrylic acid by the interaction of acetone cyanhydrin, an inorganic acid and an alcohol, the steps which comprise treating the reaction product obtained from acetone cyanhydrin and sulphuric acid with a quantity of water, not exceeding four molecular proportions based on the acetone cyanhydrin present, and finally heating in presence of the said monohydric alcohol.

2. Process of claim 1, in which the reaction mixture is heated under reflux for at least 1 hour after the addition of water and before the addition of the monohydric alcohol.

3. Process of claim 1 in which two molecular proportions of water are used.

4. Process of claim 1 in which the reaction is carried out in presence of an antipolymerization catalyst.

5. In a process for the preparation of esters of methacrylic acid by the interaction of acetone cyanhydrin, an inorganic acid and an alcohol, the steps which comprise treating the reaction product obtained from acetone cyanhydrin and sulfuric acid with a quantity of water, not exceeding four molecular proportions based on the acetone cyanhydrin present before the addition of monohydric alcohol, and finally heating in the presence of the monohydric alcohol.

6. In a process for the preparation of esters of methacrylic acid by the interaction of acetone cyanhydrin, an inorganic acid and an alcohol, the steps which comprise treating the reaction product obtained from acetone cyanhydrin and sulfuric acid with a quantity of water, not exceeding four molecular proportions based on the acetone cyanhydrin present during the addition of the monohydric alcohol, and finally heating in the presence of the monohydric alcohol.

7. In a process for the preparation of esters of methacrylic acid by the interaction of acetone cyanhydrin, an inorganic acid and an alcohol, the steps which comprise refluxing the reaction product obtained from acetone cyanhydrin and sulfuric acid with a quantity of water, not exceeding four molecular proportions based on the acetone cyanhydrin present for at least one hour after the addition of the water and before the addition of the monohydric alcohol, and finally heating in the presence of the monohydric alcohol.

8. Process of claim 7 in which the reaction is carried out in the presence of an antipolymerization catalyst.

9. Process of claim 7 in which the reaction is carried out in the presence of two molecular proportions of water.

10. In a process for the preparation of methyl methacrylate by the interaction of acetone cyanhydrin, sulfuric acid and methanol, the steps which comprise treating the reaction product obtained from acetone cyanhydrin and sulfuric acid with approximately two molecular proportions of water refluxing the resulting mixture and finally heating in the presence of methanol.

JOHN W. C. CRAWFORD.

CERTIFICATE OF CORRECTION.

Patent No. 2,042,458.  June 2, 1936.

JOHN WILLIAM CROOM CRAWFORD.

It is hereby certified that error appears in the printed specification of the above numbered patent requiring correction as follows; Page 1, second column, line 43, for the word "recommended" read recommenced; and line 45, for "at" read to; and that the said Letters Patent should be read with these corrections therein that the same may conform to the record of the case in the Patent Office.

Signed and sealed this 25th day of August, A. D. 1936.

Leslie Frazer

Acting Commissioner of Patents.

(Seal)